Patented Dec. 1, 1925.

1,563,536

UNITED STATES PATENT OFFICE.

HEINRICH SPECKETER, OF GRIESHEIM-ON-THE-MAIN, GERMANY, ASSIGNOR TO CHEMISCHE FABRIK GRIESHEIM-ELEKTRON, OF FRANKFORT-ON-THE-MAIN, GERMANY.

PROCESS FOR PRODUCING ARTIFICIAL CRYOLITE FREE FROM IRON, FROM ALUMINUM-SALT SOLUTIONS CONTAINING IRON.

No Drawing. Application filed January 10, 1925. Serial No. 1,706.

*To all whom it may concern:*

Be it known that I, HEINRICH SPECKETER, a citizen of Germany, and residing at Griesheim-on-the-Main, Germany, have invented certain new and useful Improvements in Processes for Producing Artificial Cryolite Free from Iron, from Aluminum-Salt Solutions Containing Iron, of which the following is a specification.

The present invention relates to the production of artificial cryolite, free from iron, from aluminum salt solutions containing iron. I have found that under certain conditions sodium chiolite free from iron can be obtained from above solutions, which chiolite may be combined with sodium fluoride to form artificial cryolite.

The production of sodium chiolite may be carried out in the following manner:—Hot hydrofluoric acid is run while stirring, into an aluminum chloride solution heated to 60° C. at least, the quantity of the hydrofluoric acid being calculated in such a manner that at most 9 molecules of hydrofluoric acid are present to one molecule of aluminum oxid. The aluminum chloride solution may contain a considerable proportion of ferric chloride. On adding a hot saturated solution of alkali metal chloride, for instance common salt in the proportion of at least 3 molecules of sodium chloride to one molecule of aluminum oxid, sodium chiolite is formed.

I have found that the chiolite thus obtained is free from iron and that its separation may be facilitated by continuing the stirring, before the sodium chloride is added, for some time, say half an hour.

Furthermore I have found that on mixing the chiolite, after separation and washing, with pure sodium fluoride in the proportion of 3 molecules of sodium fluoride to 2 atoms of aluminum in the chiolite, with or without the addition of some water, and filtering off the crystallized mass, an aggregation between chiolite and sodium fluoride has taken place and the corresponding artificial cryolite free from iron has been formed.

This peculiar affinity or aggregation may also be used for extracting and recovering in the form of chiolite the rest of dissolved fluorides from certain solutions containing hydrofluoric salts, for instance mother liquors from the production of simple or complex fluorine compounds.

The acid filtrate from the chiolite, containing iron, may again be saturated with aluminum by using it for extracting potter's earth (preferably calcined) and again producing chiolite free from iron from which artificial cryolite may be obtained in the above described manner. In this connection, it is remarkable that the parts of fluorides remaining in the strong hydrochloric solution in the form of complex fluorine compounds do not react with the silicic acid of the potter's earth, but, in the formation of chiolite or cryolite respectively.

Now I have found that the cryolite thus obtained may again be transformed to chiolite and the latter may anew be used for the above mentioned cleansing operation by heating the cryolite with mineral acid, for instance hydrochloric acid with or without the addition of aluminum salts. When using aluminum salts chiolite is continuously formed anew; when using acid alone the quantity of the chiolite remains unchanged.

I claim:—

1. Process of producing artificial cryolite free from iron from aluminum salt solutions containing iron, which process comprises adding to the said solutions while stirring 9 molecules of hydrofluoric acid at most and 3 molecules of alkali metal chloride at least to one molecule of aluminum oxide and treating in the presence of water the precipitate thus obtained with alkali metal fluoride.

2. Process of producing artificial cryolite free from iron from aluminum salt solutions containing iron, which process comprises adding to the said solutions while stirring 9 molecules of hydrofluoric acid at most, continuing the stirring of the mixture for some time, adding 3 molecules of alkali metal chloride at least to one molecule of aluminum oxid, and treating in the presence of water the precipitate thus obtained with alkali metal fluoride.

3. Process of producing artificial cyrolite free from iron from aluminum salt solutions containing iron, which process comprises adding to the said solutions while stirring 9 molecules of hydrofluoric acid at most and 3 molecules of alkali metal chloride at least to one molecule of aluminum oxid, mixing the precipitate thus obtained with water and alkali metal fluoride to form a moist paste of salts, and letting the mass react.

4. Process for producing artificial cryolite, free from iron, from aluminum salt solutions containing iron, which process comprises extracting potter's earth with acid mother liquors obtained in the production of chiolite, adding to the aluminum salt solutions thus obtained while stiring 9 molecules of hydrofluoric acid at most and 3 molecules of alkali metal chloride at least to one molecule of aluminum oxid, and treating in the presence of water the precipitate thus obtained with alkali metal fluoride.

5. Process of producing artificial cryolite free from iron from aluminum salt solutions containing iron, which process comprises adding to the solutions while stirring 9 molecules of hydrofluoric acid at most and 3 molecules of alkali metal chloride at least to one molecule of aluminum oxid, and treating the precipitate thus obtained with the mother liquors containing alkali metal fluoride obtained in the production of simple or complex fluorine compounds.

In testimony whereof I affix my signature.

HEINRICH SPECKETER.